United States Patent [19]

Yaeger et al.

[11] Patent Number: 4,551,974
[45] Date of Patent: Nov. 12, 1985

[54] SHAPE MEMORY EFFECT ACTUATOR AND METHODS OF ASSEMBLING AND OPERATING THEREFOR

[75] Inventors: John R. Yaeger, Sunnyvale; Robert K. Morgan, Pleasant Hill, both of Calif.

[73] Assignee: Raychem Corporation, Menlo Park, Calif.

[21] Appl. No.: 604,784

[22] Filed: Apr. 27, 1984

[51] Int. Cl.[4] .............................................. F03G 7/06
[52] U.S. Cl. ..................................... 60/527; 337/139; 337/140; 337/393; 60/528
[58] Field of Search ............... 337/139, 140, 141, 393, 337/395; 60/527, 528, 529

[56] References Cited

U.S. PATENT DOCUMENTS

| | | | |
|---|---|---|---|
| 3,594,674 | 7/1971 | Willson | 337/139 |
| 3,594,675 | 7/1971 | Willson | 337/140 |
| 3,613,732 | 10/1971 | Willson | 137/625.44 |
| 3,634,803 | 1/1972 | Willson | 337/123 |
| 3,707,694 | 12/1972 | DuRocher | 337/139 |
| 3,849,756 | 11/1974 | Hickling | 337/140 |

FOREIGN PATENT DOCUMENTS

| | | |
|---|---|---|
| 1554738 | 10/1979 | United Kingdom . |
| 2024422A | 1/1980 | United Kingdom . |

*Primary Examiner*—Allen M. Ostrager
*Attorney, Agent, or Firm*—Ira D. Blecker

[57] ABSTRACT

Disclosed is a shape memory effect actuator. The actuator comprises a biasing means which is normally biased in a first position and a shape memory alloy actuator element cooperatively engaged with the biasing means. The actuator element in a first unactivated condition is biased in the first position by the biasing means. In a second unactivated condition, the actuator element biases and retains the biasing means in a second position. The actuator element in an activated condition biases the biasing means in the second position. Also disclosed is a method of assembling an actuator and a cooperating apparatus and a method of operating the actuator.

21 Claims, 5 Drawing Figures

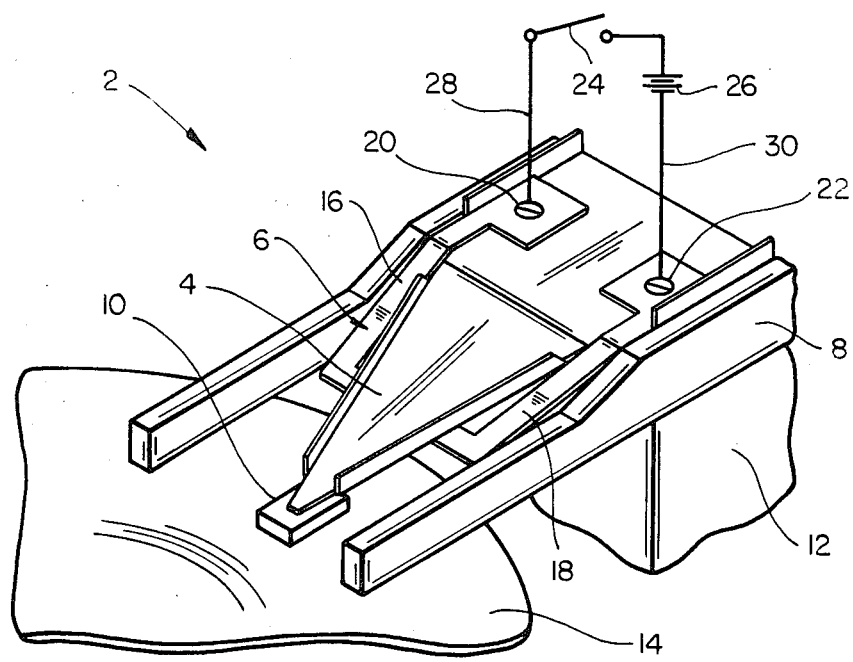
FIG_1
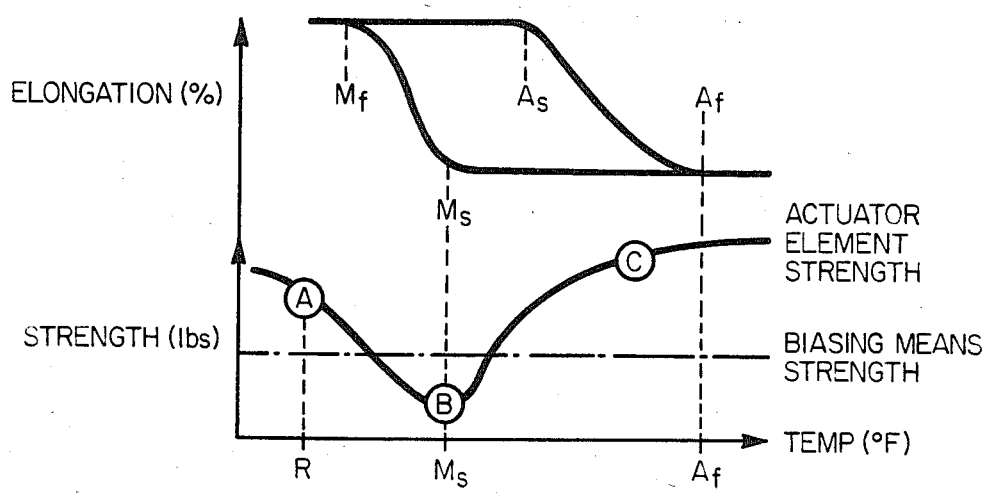
FIG_3

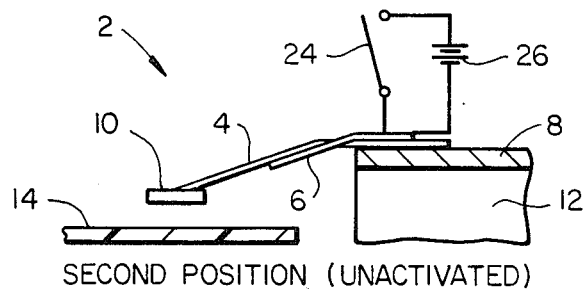
FIG_2A
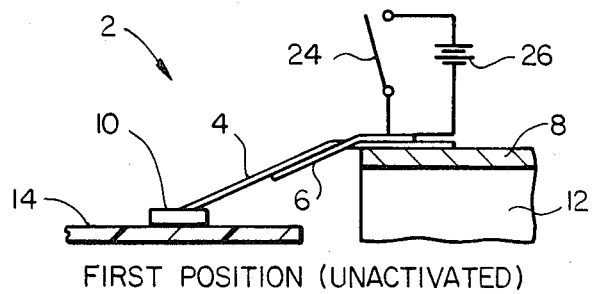
FIG_2B
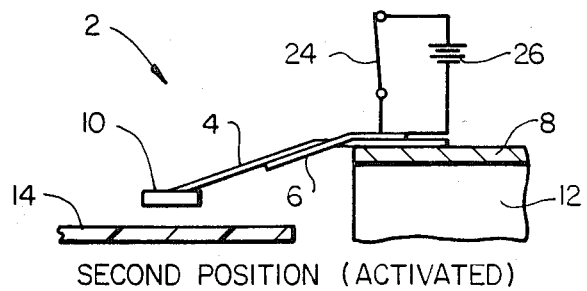
FIG_2C

SHAPE MEMORY EFFECT ACTUATOR AND METHODS OF ASSEMBLING AND OPERATING THEREFOR

BACKGROUND OF THE INVENTION

This invention relates to the field of electromechanical actuators and, particularly, to shape memory effect actuators.

The use of shape memory alloys in actuators of all types is well known. These actuators typically take advantage of the shape memory effect to trip a switch or break a contact upon reaching a critical temperature. For example, in U.S. Pat. No. 3,707,694 to DuRocher, a shape memory alloy element is heat treated to form a first shape which is a substantially planar configuration. Once below the alloy's critical temperature, the element may be deformed into a second shape which is arcuate. When the critical temperature is reached during operation, the shape memory alloy will "remember" its first shape and conform, or attempt to conform, to it. In DuRocher, there is a biasing member which deforms the shape memory alloy element into the arcuate shape so as to make an electrical contact when below the critical temperature. Upon reaching the critical temperature, the shape memory alloy element returns (or attempts to return) to its planar configuration, displaces the biasing member, and breaks the electrical contact. The heat supplied to the actuator may be in the form of electrical resistance or an outside heat source.

Other examples of actuators are disclosed in Willson U.S. Pat. No. 3,594,674; Willson, U.S. Pat. No. 3,594,675; Willson et al., U.S. Pat. No. 3,613,732; Willson et al., U.S. Pat. No. 3,634,803; Hickling, U.S. Pat. No. 3,849,756; Hart, U.K. Patent Specification No. 1,554,738; and Hart, U.K. Pat. Application No. 2,024,422A.

Some of these actuators will automatically reset upon cooling down from above the critical temperature. This is the case of the above-mentioned DuRocher patent where the biasing member, once below the critical temperature, deforms the shape memory alloy element back into electrical contact with a substrate, thereby resetting the actuator.

Others of these actuators, such as in the Hickling U.S. Patent and the Hart U.K. patent application need to be manually reset. That is, the shape memory alloy element needs to be manually deformed into contact with a cooperating member so that it will once again be capable of activating upon exposure to a heat source.

The shape memory alloys that have been used with the above actuators are usually either copper-based or nickel/titanium based. These alloys are well known to those skilled in the art.

Whether the actuator is manually or automatically reset, a common element of all of the above actuators is that the actuator is activated upon reaching the critical temperature which is normally above room temperature. Under certain circumstances, however, it would be desirable to manually position the actuator (without heating it) prior to reaching the critical temperature while also having it automatically resetable.

To manually position the actuator prior to reaching the critical temperature is difficult to achieve since the biasing member is designed to be stronger than the martensitic shape memory alloy element. Thus, any attempt to manually actuate the actuator by movement of the weaker shape memory alloy element will be overcome by the biasing member.

Accordingly, it is an object of this invention to be able to manually position a shape memory effect actuator as well as activate it in response to a change in temperature.

It is another object of this invention to have a shape memory effect actuator which is relatively simple in design yet is capable of being manually positioned as well as activated in response to a change in temperature.

These and other objects of the invention will become apparent to those skilled in the art after reference to the following specification considered in conjunction with the accompanying drawings.

BRIEF SUMMARY OF THE INVENTION

Disclosed according to the invention is a shape memory effect actuator. The actuator comprises a biasing means which is normally biased in a first position and a shape memory alloy actuator element which is cooperatively engaged with the biasing means. In a preferred embodiment, the biasing means is a biased arm. The shape memory alloy actuator element in a first unactivated condition is biased in the first position by the biasing means. The shape memory alloy actuator element in a second unactivated condition biases and retains the biasing means in a second position. In an activating condition the shape memory alloy actuator element also biases the biasing means in the second position.

The phenomenon of shape memory is, of course, well known. The ability to possess shape memory is a result of the fact that the shape memory alloy undergoes a reversible transformation from an austenitic state to a martensitic state with a change in temperature. An article made of such an alloy is easily deformed from its original configuration to a new configuration when cooled below the temperature at which the alloy is tranformed from the austenitic state to the martensitic state. The temperature at which this transformation begins is usually referred to as the $M_s$ temperature and the temperature at which this transformation is complete is the $M_f$ temperature. When an article thus deformed is warmed to the temperature at which the alloy starts to revert back to austenite, referred to as the $A_s$ temperature, the deformed object will begin to return to its original configuration. The reversion of the alloy will be complete upon reaching the $A_f$ temperature.

The use of shape memory alloys in actuators is also known as previously discussed in the Background of the Invention. However, as will be explained hereafter, applicants have taken advantage of the unique properties of shape memory alloys to invent a new actuator which can be manually positioned below the $M_s$ temperature or activated upon the application of heating to above the $A_s$ temperature. Thus applicants' shape memory effect actuator represents an improvement of the heretofore described prior art shape memory effect actuators.

BRIEF DESCRIPTION OF THE DRAWINGS

FIG. 1 is a perspective view of an embodiment of the shape memory effect actuator according to the invention.

FIGS. 2a, 2b, and 2c are schematic side views of the various positions of the actuator according to the invention.

FIG. 3 is a graph illustrating the strength of the shape memory alloy actuator element versus temperature. Superimposed on the graph is a plot of the shape memory alloy hysteresis versus temperature.

DETAILED DESCRIPTION OF THE INVENTION

Referring now to the drawings in more detail and particularly referring to FIGS. 1 and 2, there is disclosed according to the invention a shape memory effect actuator 2. The actuator comprises a biasing means 4 which is normally biased in a first position. The position of the biasing means in the first position is as shown in FIG. 2b. The actuator further comprises a shape memory alloy actuator element 6 cooperatively engaged with the biasing means 4. The actuator element in its first unactivated condition is biased in the first position by the biasing means as shown by FIG. 2b. In a second unactivated condition, the actuator element biases and retains the biasing means in a second position. This is as shown in FIG. 2a. In the activated condition, the actuator element biases the biasing means in the second position, as shown in FIG. 2c.

In the Figures, the biasing means is shown as a biased arm; however, other biasing means (not shown) such as helical springs, etc., are contemplated within the scope of the invention.

It is clear that FIGS. 2a and 2c show the actuator in the second position wherein the actuator element lifts or holds up the biasing means. The difference in the figures is that in FIG. 2a, the actuator is unactivated and in FIG. 2C, the actuator is activated. FIG. 2b shows the actuator in the first position wherein the biasing means biases the actuator element down and the actuator element is in the unactivated condition.

The biasing means 4 always has a net force pushing downward whereas the actuator element 6, when activated, has a net force upward.

Since, as shown in FIG. 2a, the actuator element biases the biasing means while in the unactivated condition, the biasing means and actuator element must somehow be moved to the second position. While there are various ways that this may occur, a particularly preferred way is to manually move the actuator element and biasing means arm to the second position. It is also necessary to the invention that the shape memory alloy actuator element retain the biasing means arm in this second position after being manually moved there. The means by which the actuator element retains the biasing means in this second position will be described hereafter.

The shape memory alloy actuator element undergoes the shape memory effect when activated such that the shape memory alloy transforms from the martensitic condition to the austenitic condition when activated by the application of heating means. It is necessary to the invention that the shape memory alloy actuator element returns back to the martensitic condition when unactivated by the application of cooling means. While there are several different forms of heating and cooling means, the preferred means comprise electrical resistance heating and exposure to ambient air, respectively.

When the preferred heating means comprises electrical resistance heating, the actuator element is activated by closing switch 24. Power supply 26 then pushes electric current through the actuator element. When switch 24 is open, the actuator element is said to be in the unactivated condition, regardless of the temperature of the actuator element.

Since in one embodiment of the invention the heating means is by electrical resistance heating, it is preferred in this embodiment that the shape memory alloy actuator element have a nonconductive coating (i.e., Teflon ® material*) so as to avoid short circuiting the actuator element against the biasing means or any support structure that may be present.

*Teflon ® is a registered trademark of E. I. Du Pont de Nemours

It is also preferred that the shape memory alloy has an $M_s$ temperature above room temperature. It is most preferable that the shape memory alloy at room temperature has greater strength than the biasing means at room temperature. The importance of these performents of the invention will become apparent hereafter.

In a preferred application of the actuator, as shown in FIGS. 1 and 2, the actuator further comprises a support structure 8. In this preferred application, the biasing means is a biased arm and the actuator element 6 and the biased arm 4 are cantilevered from the support structure. The preferred application of the invention is a disc head lifter to be used in conjunction with disc 14 and a disc drive unit (not shown). In this preferred application, the actuator will comprise a disc read/write head 10, the function of which will be familiar to those skilled in the art.

The actuator element and the biasing means can assume many configurations on achieving the objects of the invention. When used in the preferred application of the invention, the biasing means 4 will be a biased arm 4 and will have a generally triangular shape. The shape memory alloy actuator element 6 will have a generally U-shaped configuration such that the biased arm will pass through the "U" of the shape memory alloy actuator element. The legs 16,18 of the actuator element 6 are connected by fastening means 20, 22 respectively to the support structure 8. When the actuator element is activated by electrical resistance heating, suitable leads 28, 30 may be connected at the fastening means 20, 22, respectively.

The functioning of the actuator will now be described in greater detail in conjunction with FIG. 3. FIG. 3 shows a graph of the strength of a shape memory alloy actuator element versus temperature. The temperatures $M_s$ and $A_f$ have already been defined in the Background of the Invention. Temperature R represents the operating temperature of the actuator which for most situations will be room temperature. It is known that a graph such as this will show a trough near or at the temperature wherein the shape memory alloy goes through the $M_s$ temperature. Generally speaking, the magnitude of the difference in strength of the shape memory alloy at points A and B will vary depending upon the alloy. Also shown on FIG. 3 is a graph of the strength of the biasing means versus temperature which is nominally constant over the temperature ranges considered.

As an aid to the understanding of our invention, superimposed on FIG. 3 is a plot of the hysteresis typically exhibited by the shape memory alloy actuator element. FIG. 3 then, in toto, illustrates the relationship of the strength of the shape memory alloy actuator element to the reversible phase transformation of the shape memory alloy. The $M_s$ and $A_f$ temperatures on the hysteresis correspond to the $M_s$ and $A_f$ temperatures on the horizontal axis of FIG. 3. The hysteresis has been determined by measuring elongation versus temperature; a method known to those skilled in the art.

As previously described, the actuator comprises a biasing means cooperatively engaged with an actuator element. The biasing means is normally in a first position (FIG. 2b) but is capable of being moved to a second position (FIG. 2a or 2c). The actuator element has a first position and a second position corresponding to the first and second positions of the biasing means. The actuator element comprises a shape memory alloy having a martensitic condition and an austenitic condition.

In the first position the actuator element is in the martensitic condition and is biased in the first position by the biasing means. In the second position, the biasing means is biased by the actuator element. In the second position, the actuator element will be in the martensitic condition when moved to the second position by manual manipulation and in the austenitic condition when moved to the second position by the shape memory effect.

The actuator element has been heat treated so that in the heat stable austenitic condition, the actuator element will be in the second position. When the actuator element is in the first posiiton, it will be in the heat unstable martensitic condition.

If the actuator is in the first posiiton, the application of sufficient heat (by whatever means) will cause the actuator element to revert to the austenitic condition. The actuator element in the austenitic condition has greater strength than the biasing means, as seen at Point C on FIG. 3, so that the actuator element (and therefore the actuator) will be in the second position.

When the heat is removed and the actuator element is cooled (either by exposure to ambient air or some other cooling means), the actuator element will go through a strength minimum at $M_s$, as seen at Point B, and transform to the martensitic condition. Since the biasing means is now stronger than the actuator element, the actuator will be in the first position. Further cooling will increase the strength of the actuator element, as seen at Point A, but will not alter its position.

At R, heat can be applied to move the actuator (by the shape memory effect) to the second position, then heat removed to return the actuator to the first position and so on. Or, at R, the actuator element can be manually moved to the second position. Even though the actuator element is in the martensitic condition, the actuator element will lift up and retain the biasing means in the second position due to the greater strength of the actuator element at R. The actuator element can actually be moved a considerable distance due to the large amount of deformation that can be recovered upon heating above $A_f$, which is characteristic of shape memory alloys.

If the actuator element at R has been manually moved to the second position, the application of heat will cause the actuator element to first encounter the strength minimum at $M_s$ and move to the first position. If the heat is removed, the actuator will remain in the first position. If the heat continues to be applied, the actuator will then move to the second position. Removal of the heat at the second position will cause the actuator to return to the first position, as described above.

While those skilled in the art will recognize that there are many shape memory alloys that will achieve the objects of the invention, one preferred alloy is the nickel/titanium copper alloy as disclosed in pending U.S. Patent Application Ser. No. 537,316 which is hereby incorporated by reference. When this preferred alloy is used, $M_s$ will be well above room temperature and the temperature at which the shape memory alloy has greater strength than the biasing means will be around room temperature. Thus, this preferred alloy will exactly achieve the objects of the invention. Of course, if the room temperature is well below the room temperature normally encountered such as might be the case in a refrigerated room, other shape memory alloys known to those skilled in the art may be substituted for the nickel/titanium/copper alloy.

As will be appreciated, there are various combinations of operative steps that may be employed with the shape memory effect actuator. According to the invention, several of these combinations are illustrated below.

There is a method of assembling an actuator 2 to a cooperating apparatus 12. The method comprises assembling an actuator comprising a biasing means 4 cooperatively engaged with a shape memory alloy actuator element 6. The biasing means and actuator element are in a first position.

The next step in the method is manually moving the biasing means and actuator element to the second position. The method further comprises retaining the biasing means in the second position by the actuator element.

The actuator is then mounted proximate to a cooperating apparatus 12. In the preferred application of the invention as discussed previously, this apparatus represents a part of a disc drive unit (not shown).

When the actuator 2 is utilized in the preferred application as a disc head lifter, the disc head lifter is assembled to the disc drive unit in a manner such that the read/write head 10 and the disc 14 are maintained away from each other to prevent damage to each other during the assembly process.

The next steps in the method are activating the actuator element 6 by the application of heating means, and then returning the biasing means and actuator element to the first position.

The final step in the method is unactivating the actuator element by the removal of the heating means.

The method may also comprise the step of returning the biasing means and actuator element to the second position prior to the step of unactivating the actuator element. This would occur by continuing the application of heating means until the biasing means and actuator element reached the second position.

There is also disclosed according to the invention a method of operating an actuator. The actuator 2 comprises a biasing means 4 cooperatively engaged with the shape memory alloy actuator element 6 wherein the biasing means and actuator element are in a first position. The method comprises first manually moving the biasing means and actuator element to a second position and then retaining the biasing means in the second position by the actuator element.

Continuing, the method comprises activating the actuator element by the application of heating means and then returning the biasing means and actuator element to the first position.

The final step in this method is unactivating the actuator element by the removal of heating means.

The method may further comprise the step of returning the biasing means and actuator element to the second position prior to the step of unactivating the actuator element. As before, this would occur by continuing the application of heating means until the biasing means arm and actuator element reached the second position.

Either of the methods may also comprise at least one operating cycle. This operating cycle comprises firstly activating the actuator element while in the first position by the application of heating means and then moving the biasing means and actuator element to the second position. This represents the first half of the cycle.

In the second half of the cycle the method comprises unactivating the actuator element by the removal of the heating means and then returning the biasing means and actuator element to the first position.

It can thus be seen that the first half of the operating cycle comprises activating the actuator element in the first position and then moving the actuator to the second position while the second half of the cycle comprises removal of the heating means and then returning the actuator to the first position.

It is preferred that the step of retaining the biasing means in the second position by the actuator element comprises deforming the actuator element. In this manner the actuator element in and of itself retains the biasing means in the second position without any additional mechanical arrangements.

As explained in great detail above, the shape memory alloy actuator element undergoes the shape memory effect when activated such that the shape memory alloy transforms from the martensitic condition to the austenitic condition when activated by the application of heating means and then returns back to the martensitic condition when unactivated by the removal of the heating means. In other preferments of the invention, the shape memory alloy has an $M_s$ temperature above room temperature and at room temperature has greater strength than the biasing means at room temperature.

When the actuator is used in an electrical environment it is preferred that the actuator element has a nonconductive coating so as to avoid short circuiting against the biasing means or any nearby support structure.

It will be obvious to those skilled in the art having regard to this disclosure that other modifications of this invention beyond those embodiments specifically described here may be made without departing from the spirit of the invention. Accordingly such modifications are considered to be within the scope of the invention as limited solely by the appended claims.

We claim:

1. A shape memory effect actuator comprising:
a biasing means normally biased in a first position;
a shape memory alloy actuator element cooperatively engaged with said biasing means which in a first unactivated condition is biased in said first position by said biasing means, in a second unactivated condition biases and retains said biasing means in a second position, and in an activated condition biases said biasing means in said second position.

2. A shape memory effect actuator comprising:
a biasing means normally biased in a first position;
a shape memory alloy actuator element copperatively engaged with said biasing means which in a first unactivated condition is biased in said first position by said biasing means, in a second unactivated condition biases and retains said biasing means in a second position after being manually moved to said second position, and in an activated condition biases said biasing means in said second position.

3. The actuator of claims 1 or 2 wherein said shape memory alloy actuator element undergoes the shape memory effect when activated such that said shape memory alloy transforms from the martensitic condition to the austenitic condition when activated by the application of heating means and returns back to the martensitic condition when unactivated by the application of cooling means.

4. The actuator of claim 3 wherein said shape memory alloy has an $M_s$ temperature above room temperature.

5. The actuator of claim 3 wherein said heating means comprises electrical resistance heating.

6. The actuator of claim 3 wherein said cooling means comprises ambient air.

7. The actuator of claim 3 wherein said shape memory alloy at room temperature has greater strength than said biasing means at room temperature.

8. The actuator of claims 1 or 2 wherein said shape memory alloy actuator element has a nonconductive coating.

9. The actuator of claims 1 or 2 further comprising a support structure wherein said actuator element and biasing means are cantilevered from said support structure.

10. A shape memory effect actuator comprising:
a biasing means, said biasing means being normally biased in a first position and capable of being moved to a second position;
an actuator element cooperatively engaged with said biasing means;
said actuator element having a first position and a second position corresponding to said first and second positions of said biasing means;
said actuator element comprising a shape memory alloy having a martensitic condition and an austenitic condition;
in said first position said actuator element is in the martensitic condition and is biased in said first position by said biasing means;
in said second position said actuator element biases and retains asaid biasing means in said second positon; said actuator element being in the martensitic condition when moved to said second position by manual manipulation and in the austenitic condition when moved to said second position by the shape memory effect.

11. A method of assembling an actuator and a cooperating apparatus comprising;
assembling an actuator comprising a biasing means cooperatively engaged with a shape memory alloy actuator element wherein the biasing means and actuator element are in a first position;
manually moving the biasing means and actuator element to a second position;
retaining the biasing means in the second position by the actuator element; and mounting the actuator proximate to a cooperating apparatus.

12. The method of claim 11 after the step of mounting the actuator, further comprising:
activating the actuator element by the application of heating means;
returning the biasing means and actuator element to the first position;
unactivating the actuator element by the removal of the heating means.

13. The method of claim 12 further comprising the step of returning the biasing means and actuator element to the second position prior to the step of unactivating the actuator element.

14. A method of operating an actuator, the actuator comprising a biasing means cooperatively engaged with a shape memory alloy actuator element wherein the biasing means and actuator element are in a first position, the method comprising:
   manually moving the biasing means and actuator element to a second position;
   retaining the biasing means in the second position by the actuator element;
   activating the actuator element by the application of heating means;
   returning the biasing means and actuator element to the first position;
   unactivating the actuator element by the removal of the heating means.

15. The method of claim 14 further comprising the step of returning the biasing means and actuator element to the second position prior to the step of unactivating the actuator element.

16. The method of claims 14 or 15 further comprising at least one operating cycle comprising:
   activating the actuator element by the application of heating means;
   moving the biasing means and actuator element to the second position;
   unactivating the actuator element by the removal of the heating means;
   returning the biasing means and actuator element to the first position.

17. The method of claims 11 or 14 wherein the step of retaining comprises plastically deforming the actuator element.

18. The method of claims 11 or 14 wherein the shape memory alloy actuator element undergoes the shape memory effect when activated such that the shape memory alloy transforms from the martensitic condition to the austenitic condition when activated by the application of heating means and returns back to the martensitic condition when unactivated by the removal of the heating means.

19. The method of claim 18 wherein the shape memory alloy has an $M_s$ temperature above room temperature.

20. The method of claims 11 or 14 wherein the shape memory alloy at room temperature has greater strength than the biasing means at room temperature.

21. The method according to claims 11 or 14 wherein the actuator element has a nonconductive coating.

* * * * *